United States Patent [19]

Chapin

[11] Patent Number: 4,778,524

[45] Date of Patent: Oct. 18, 1988

[54] BUFFING COMPOSITION AND METHOD OF USE

[75] Inventor: Jay C. Chapin, Salem, Mass.

[73] Assignee: M. D. Stetson Company, Randolph, Mass.

[21] Appl. No.: 31,087

[22] Filed: Mar. 26, 1987

Related U.S. Application Data

[63] Continuation-in-part of Ser. No. 839,786, Mar. 14, 1986, Pat. No. 4,749,411.

[51] Int. Cl.$^4$ ............................ C09G 1/08; B05D 3/12
[52] U.S. Cl. .......................................... 106/10; 106/3; 427/355
[58] Field of Search ............... 106/3, 287.23; 427/355, 427/331, 368, 369, 429; 252/89.1, 174.21

[56] References Cited

U.S. PATENT DOCUMENTS

| | | | |
|---|---|---|---|
| 3,072,492 | 1/1963 | Smith et al. ............................ | 106/4 |
| 3,088,838 | 5/1963 | Woodard et al. ............... | 106/287.23 |
| 3,413,252 | 11/1968 | Lima ....................................... | 106/3 |
| 3,645,946 | 2/1972 | Lyman .................................... | 106/10 |
| 4,526,815 | 7/1985 | Hackett et al. ....................... | 427/355 |
| 4,537,802 | 8/1985 | Flanagan ............................... | 427/368 |

Primary Examiner—Prince E. Willis
Attorney, Agent, or Firm—Wolf, Greenfield & Sacks

[57] ABSTRACT

A water-based buffing composition which forms a high-gloss, slip-resistant coating on a surface when dried and high-speed buffed. The composition is a solution, the solute portion of which consists of a solid, waxy polyethylene glycol compound having a high molecular weight, and a heat-stable, non-volatile plasticizer compatible with the polyethylene glycol which is water soluble or water dispersible and selected from the group consisting of phthalates, adipates, sebacates, phosphates, sulfonamides, and mixtures thereof, and the solvent portion of which comprises water. The plasticizer may be a highly water-soluble compound such as triethyl phosphate, a water insoluble compound such as tri(butoxyethyl) phosphate which forms a stable dispersion with water, or a fatty acid such as oleic acid saponified with a volatile base to create a stable dispersion in water.

19 Claims, No Drawings

4,778,524

BUFFING COMPOSITION AND METHOD OF USE

RELATED APPLICATION

This application is a continuation-in-part of Ser. No. 839,786, filed by Jay C. Chapin on Mar. 14, 1986, now U.S. Pat. No. 4,749,411 and entitled "Disinfecting And High-Speed Buffing Composition And Method Of Use."

BACKGROUND OF THE INVENTION

This invention concerns a buffing composition that is used in conjunction with a high-speed buffing machine to restore the gloss to a synthetic floor finish and, additionally, to increase the slip resistance of the floor finish.

The advent of long-wearing synthetic floor polishes provided a need for buffing compositions to clean, repair, and restore the gloss of the synthetic floor coating. Such buffing compositions are typically applied to the floor surface with a sprayer or mop, allowed to dry, and then polished by means of a buffing machine.

For example, in U.S. Pat. No. 4,371,398 to Frochielli, there is described a polyolefin emulsion for restoring the gloss and increasing the slip resistance of a floor coating. The water-insoluble polyolefin necessitates use of an emulsifying agent.

In U.S. Pat. No. 4,537,802 to Flanagan, there is described a wax free cleaning and buffing composition for reconditioning plastic coated floor surfaces. The restoring composition, which is said to establish a fusion or relamination of the base finish, includes liquid polyalkylene glycol, glycol ether as a solvent, a surfactant, and water.

In U.S. Pat. No. 3,669,892 to Abler et al., there is described an aerosol spray cleaner polish composition consisting of a styrene and/or acrylic polymer emulsion, a surfactant emulsifier, a hydrocarbon aerosol propellant, a detergent, and optionally, tri(butoxyethyl) phosphate.

Thus, many of the prior art compositions contain water insoluble ingredients which necessitate the presence of a solvent other than water. The use of other solvents increases the cost and in some situations are environmentally unacceptable, such as in health care facilities. Furthermore, the water insoluble ingredients tend to collect on the polishing pad and are difficult to remove from the pad with soap and water. Thus, it would be desirable to provide a composition for restoring acrylic and/or styrene based floor finishes wherein all or at least the major portion of the components are water soluble.

SUMMARY OF THE INVENTION

The composition of this invention is a water based buffing composition for forming a high-gloss, slip resistant coating on a surface. The composition is applied to the floor as a solution, wherein the solute portion includes a solid, waxy polyethylene glycol compound and a heat stable, nonvolatile plasticizer, and the solvent portion is water.

The solid, waxy polyethylene glycol (PEG) compound forms a high gloss coating on the surface on buffing. The plasticizer aids in forming a continuous film coating and also increases the static coefficient of friction, i.e., slip resistance, of the buffed finish. The composition can be applied either in concentrated form with a spray bottle, or mopped on the surface in diluted form. The composition can be buffed either wet or dry.

The plasticizer must be compatible with the PEG and is selected from the group consisting of phthalates, adipates, sebacates, phosphates, sulfonamides, fatty acids, and mixtures thereof. Preferred plasticizers include triethyl phosphate, tri(butoxyethyl) phosphate, tricresyl phosphate, tri(butyl) phosphate, triphenyl phosphate, cresyldiphenyl phosphate, 2-ethyl-hexyl diphenyl phosphate, dibutyl phthalate, butyl octyl phthalate, di(2-ethylhexyl) phthalate, dioctyl phthalate, di(2-ethylhexyl) adipate, dibutyl sebacate, a fatty acid having from six to eight carbon atoms, and o,p-toluene sulfonamide. Especially preferred is triethyl phosphate. Another preferred plasticizer is tri(butoxyethyl) phosphate (TBEP), which, although water insoluble, can be homogenized to form a stable dispersion in water. Another preferred plasticizer is saponified oleic acid wherein the base saponifying agent is volatilized during drying and buffing of the film.

In concentrated form, the preferred solution contains about 6% solids. Preferably, the concentrated solution is diluted in the amount of about 6 ounces of concentrated solution to one gallon of water to form an application solution.

In the preferred application solution, the solute portion (PEG and plasticizer) comprises of from about 0.15 to about 2.0% by weight of the solution, and more preferably of from about 0.2 to 0.6% by weight of the solution. Furthermore, it is preferred that the weight percentage of the polyethylene glycol comprises at least twice, and more preferably four times, the weight percentage of the plasticizer. An especially preferred composition contains PEG having a molecular weight of about 20,000, a plasticizer selected from the group consisting of triethyl phosphate, tri(butoxyethyl) phosphate, and oleic acid, the solute portion being about 0.3% by weight of the solution, and the weight percentage of the PEG being at least about four times the weight percentage of the plasticizer.

DETAILED DESCRIPTION OF THE PREFERRED EMBODIMENT

The composition of this invention not only coats a surface, such as a floor, in the manner of a polish, but also restores on buffing the surface coating or polish already on the floor, thus obviating the necessity of removing the old polish.

The composition of this invention:
1. provides a high gloss surface;
2. substantially increases the slip resistance (safety) of floor surfaces;
3. resists powdering;
4. prolongs the life of the floor surface;
5. reduces the number of times which the floor needs to be cleaned and/or worn out floor finishes removed and new floor polish applied;
6. shortens the time necessary to restore the gloss by reducing the friction between floor surface and pad;
7. prolongs the life of the buffing machine by the reduction of friction;
8. provides resistance to the damaging effects of water, dirt, salts, de-icers, and heel marks;
9. can be dry buffed at any time to remove scuff marks and improve the gloss without requiring the application of additional restorer composition; and 10. is easily removed from the buffing pad by rinsing in water.

The polishes of this invention are characterized by the presence of a high molecular weight polyethylene glycol and a plasticizer either dissolved or dispersed in water. The polyethylene glycol compounds are water-soluble, waxy solids having a high molecular weight which form a very hard surface finish after high-speed buffing. The plasticizer is heat stable and nonvolatile and assists in forming a continuous film on the surface and increasing the static coefficient of friction, i.e., slip resistance, of the coating.

The polishes of this invention can be applied to hard surfaces (particularly floors) with ease of application and without detriment to a wide variety of surfaces such as sealed wood, sealed concrete, asphalt tile, rubber tile, vinyl tile, vinyl asbestos tile, ceramic tile, terrazzo and any other surfaces common to the flooring industry. The invention can also be used successfully on surfaces protected by floor polishes, floor seals, and varnishes.

The invention is particularly useful when used as part of a system for maintaining and for restoring the gloss of an all acrylic or acrylic/styrene based floor finish on a routine basis. The restorer polish of this invention can then be applied to the floor finish weekly or as often as needed, in concentrated form with a spray bottle or in more dilute form with a mop, and buffed either wet or dry. In many instances it is preferred to buff after the composition has dried because the buffing machine moves more easily than when the floor is wet. The composition will dry to a low sheen, and with the use of a 100% natural fiber or synthetic high speed polishing pad in a floor polish machine it polishes to a high gloss. For the quickest job, a high speed machine (300–3000 rpm) is used for buffing to instantly bring the floor to full brilliance.

The polyethylene glycol (PEG) compounds useful in this invention include any of several condensation polymers of ethylene glycol having the generalized formula:

where n represents the average number of oxyethylene groups. The polyethylene glycol compounds are water-soluble, waxy solids having a high molecular weight which form a very hard surface finish after high-speed buffing. The polyethylene glycol compound has a number average molecular weight of at least about 1450 (n=31), preferably at least about 8000 (n=180), and more preferably at least about 20,000 (n=452). Suitable polyethylene glycol compounds are available from Union Carbide Corporation, New York, N.Y., under the mark "Carbowax" and from Dow Chemical Co., Midland, Mich., under the mark "Dow PEG Compound Polyglycol."

One of the principle benefits of this invention derives from the water soluble nature of the PEG wax. One of the great difficulties with prior art wax products which include, for example, carnauba wax, is that the wax is picked up by the buffing pad, which decreases the pad's efficiency. Furthermore, it is difficult to completely clean the pad of any wax residue by washing with soap and water. In contrast, the PEG wax of this invention, being completely soluble, is readily removed by simple rinsing in water.

A plasticizer is required for use with the high molecular weight PEG to enhance the film forming capability of the solution and to bring the buffed surface finish within recognized safety standards for a safe walkway surface. The plasticizer can be any of several heat-stable and nonvolatile compounds. By heat stable it is meant that the plasticizer is stable at temperatures commonly encountered during buffing, and preferably the plasticizer has a boiling point of at least about 300° F. (148.9° C.). By nonvolatile it is meant that the plasticizer remains on the floor for the lifetime of the restored finish, and thus at a minimum for a period of several days.

The plasticizers useful in this invention include phthalates, adipates, sebacates, phosphates, sulfonamides, and fatty acids. The first three groups are esters of dicarboxylic acids—a phthalate being an ester of phthalic acid, $C_6H_4(COOH)_2$, an adipate being an ester of adipic acid, $COOH(CH_2)_4COOH$, and a sebacate being an ester of sebacic acid, $COOH(CH_2)_8COOH$. Phosphates are esters of phosphoric acid $H_3PO_4$. A sulfonamide has the typical structure $RSO_2NH_2$.

The fatty acids are carboxylic acids derived from or contained in an animal or vegetable fat or oil. They are composed of a chain of alkyl groups containing from 4 to 22 carbon atoms (usually even-numbered) and characterized by a terminal carboxyl-group —COOH. The generic formula for all fatty acids above acetic is $CH_3(CH_2)_nCOOH$ (the carbon atom count includes the carboxyl group). Fatty acids may be saturated or unsaturated.

A particularly preferred stabilizer is triethyl phosphate (TEP), which has the formula: $(C_2H_5)_3PO_4$. TEP is water soluble and compatible with solutions of PEG and thus may be used in the composition of this invention without emulsification.

It is believed that the most suitable plasticizers for the intended purpose of this invention are polar compounds which are compatible with polyethylene glycol, i.e., those plasticizers which do not exhibit phase separation when intimately mixed with PEG. The observation that many plasticizers are capable of being emulsified by PEG to form a stable dispersion or emulsion in water provides a presumptive indicator of the compatibility of the plasticizer with the PEG in the dry state. Plasticizers based on phthalate, adipate, sebacate, phosphate and sulfonamide types are all readily emulsified with PEG. Contrariwise, it was not possible to form a stable emulsion according to the above described procedure with a non-polar compound such as paraffin oil. Moreover, as the molecular weight of the PEG used to make an emulsion with a polar plasticizer is increased, the stability of the formed emulsion is increased as is also the dilutions of the emulsion in water. Thus, for example, while it is possible to make a stable emulsion of dioctyl phthalate with PEG-400, it was not possible to dilute this emulsion down to a stable application solution of 6 oz/gal water. When the higher molecular weight PEG-8000 was used with dioctyl phthalate to make an emulsion, no problem was found in making the application solution of 6 oz/gal water.

Another preferred plasticizer is tri(butoxyethyl) phosphate (TBEP), which has the formula: $C_4H_9-O-C_2H_4-O)_3PO$. While TBEP is water insoluble, it may be made into a stable dispersion by combining it with the PEG wax, heating to 150° F. (65.5° C.), and then adding the water and homogenizing in an Arde Barinco Reversible Homogenizer machine (sold by Andre Barinco, Mahwah, N.J.), to produce a stable dispersion. No surfactant is required to make the dispersion stable.

Another preferred plasticizer is oleic acid $CH_3(CH_2)_7CH:CH(CH_2)_7COOH$. The oleic acid is saponified by the base 2-amino-2-methyl-1-propanol to form a soap, and the soap, water, and PEG are homogenized with an Arde Barinco Reversible Homogenizer machine to form a stable dispersion. The base used to saponify the oleic acid will volatilize as the restoring composition dries leaving behind the oleic acid as a plasticizer.

The composition of this invention may further include other ingredients commonly used in the floor care industry, for example, odorless mineral spirits may be added for cleaning the floor. Other additives include various glycol ethers, aqua ammonia, amines, caustics to adjust the pH, water soluble acrylic polymers, etc.

The following examples illustrate the invention. In each of the examples, the following ingredients or procedures were used. The compositions are given in parts by weight. The polyethylene glycol had an average molecular weight of 20,000, and was obtained from Union Carbide Corporation, New York, N.Y., under the mark "Carbowax." The application solution was applied to a floor surface that was finished with three coats of an acrylic polymer based floor finish containing 18% solids, sold by M. D. Stetson Co., Randolph, Mass., under the name "Hard Top." The application solution was allowed to dry and then high-speed buffed with a Charger/500 buffer, model Electric Charger 1500, 1500 rpm, sold by National Super Service Co. of Maumee, Ohio, equipped with a 100% natural fiber high-speed polishing pad. After the application solution had dried, two passes were made with the machine at a slow walking pace.

The "James Machine" is commonly used in the floor care industry to evaluate quantitatively the static coefficient of friction (SCF) of floor finishes (ASTM D2047-75). With this machine, the angle at which a strut attached to a stationary shoe begins to slip on a floor surface can be determined. When using the James Machine, four readings are made on each of three test tiles (temporarily removed from the buffed floor) and the average used as the SCF figure. Floor finishes which comply with the Underwriters Laboratories Inc. requirements for a safe walkway surface have a minimal average SCF figure of 0.5. A reading below 0.50 indicates a presumptive hazardous floor surface.

EXAMPLE 1

A clear water-white solution was prepared from the following:

| | |
|---|---|
| 4.65 | parts PEG, 20,000 average molecular weight |
| 1.60 | parts triethyl phosphate |
| 93.75 | parts water |
| 100.00 | |

The triethyl phosphate was obtained from Eastman Chemical Products, Inc. of Kingsport, Tenn., under the name "Eastman TEP".

Six ounces of the above solution was added to approximately one gallon of water to give an application solution that contains 0.3% solids. The application solution was mopped onto an acrylic-based floor finish and allowed to dry. The floor was then high-speed buffed. The SCF after buffing was found to be 0.65—a safe surface. Subjectively, the floor finish was more resistant to slipping than before it had been treated and buffed.

EXAMPLE 2

A dispersion of the following ingredients was prepared:

| | |
|---|---|
| 4.65 | parts PEG, 20,000 average molecular weight |
| 1.60 | parts tri(butoxyethyl) phosphate |
| 93.75 | parts water |
| 100.00 | |

The tri(butoxyethyl) phosphate (TBEP) was obtained from FMC Corp. of Philadelphia, Pa., under the name "KP-140."

Although the TBEP plasticizer is water insoluble, a stable dispersion was made by combining the PEG wax and the TBEP, heating to 150° F., and then adding the water and homogenizing with an Arde Barinco Reversible Homogenizer to produce a stable dispersion. No surfactant was required to make the dispersion stable.

Six ounces of the above dispersion was added to approximately one gallon of water to make an application solution. The application solution was mopped onto an acrylic-based floor finish and allowed to dry. The floor was then high-speed buffed.

The SCF after buffing was found to be 0.55. The SCF was 0.5 for the finish as applied and not buffed. Thus, as applied the finish meets the minimum safe rating of 0.5, but after buffing the rating increases to 0.55.

EXAMPLE 3

A dispersion was prepared from the following ingredients:

| | |
|---|---|
| 4.00 | parts PEG, 20,000 average molecular weight |
| 1.00 | parts oleic acid |
| 0.65 | parts 2-amino-2-methyl-1-propanol |
| 6.50 | parts odorless mineral spirits |
| 87.85 | parts water |
| 100.00 | |

The oleic acid was obtained from Emery Industries, Inc. of Cincinnati, Ohio, under the name "Emersol 220 White Oleic." The fugitive base used to saponify the fatty acid, 2-amino-2-methyl-1-propanol (95%), was obtained from Angus Chemical Co. of Northbrook, Ill., under the name "AMP-95." The odorless mineral spirits was added as a cleaning agent. It was obtained from Exxon Co. of Houston, Tex., under the name "Isopar-K," and has a flash point of 127° F. (TCC).

In order to obtain a stable dispersion, the oleic acid and AMP-95 were first reacted in water to form a soap, the remaining ingredients were then added, and the composite was homogenized in an Arde Barinco Reversible Homogenizer to create a stable dispersion.

The concentrated solution was applied to the floor with a spray bottle. The fugitive base used to saponify the fatty acid volatilized after the spray-buffed residue was high-speed buffed.

The SCF after buffing was determined to be 0.55.

Although certain preferred embodiments of the invention have hereinbefore been described, it will be appreciated that variations of the invention will be perceived by those skilled in the art, which variations are nevertheless in the scope of the invention as defined by the claims appended hereto.

What is claimed is:

1. A composition which is applied to a surface in solution form and then dried and high-speed buffed to form a hard, high-gloss and slip-resistant coating on the surface, said composition in solution form having a solute portion which comprises:

a. a solid, waxy polyethylene glycol compound having the formula:

$$HOCH_2(CH_2OCH_2)_nCH_2OH$$

where n represents the average number of oxyethylene groups and is at least about 31; and b. a heat-stable, non-volatile plasticizer compatible with the polyethylene glycol compound and selected from the group consisting of phthalates, adipates, sebacates, phosphates, sulfonamides, fatty acids, and mixtures thereof;

and the solvent portion of which consists essentially of water, wherein said solution when dried and high-speed buffed forms a hard, high-gloss and slip-resistant coating, said plasticizer being present in an amount sufficient to increase the static coefficient of friction of the coating by at least about 5 percent.

2. The composition of claim 1, wherein said plasticizer increases the static coefficient of friction (slip resistance) by at least about 10 percent.

3. The composition of claim 1, wherein n is at least about 180.

4. The composition of claim 3, wherein n is at least about 452.

5. The composition of claim 1, wherein the solute portion comprises of from about 0.15 to about 2.0 percent by weight of the solution.

6. The composition of claim 5, wherein the solute portion comprises of from about 0.2 to about 0.6 percent by weight of the solution.

7. The composition of claim 5, wherein the weight percentage of the polyethylene glycol comprises at least twice the weight percentage of the plasticizer.

8. The composition of claim 7, wherein the weight percentage of the polyethylene glycol comprises at least four times the weight percentage of the plasticizer.

9. The composition of claim 1, wherein said plasticizer is selected from the group consisting of triethyl phosphate, tri(butoxyethyl) phosphate, tricresyl phosphate, tri(butyl) phosphate, triphenyl phosphate, cresyldiphenyl phosphate, 2-ethyl-hexyl diphenyl phosphate, dibutyl phthalate, butyl octyl phthalate, di(2-ethylhexyl) phthalate, dioctyl phthalate, di(2-ethylhexyl) adipate, dibutyl sebacate, a fatty acid having from six to twenty-two carbon atoms, and o,p-toluene sulfonamide.

10. The composition of claim 9, wherein said plasticizer is selected from the group consisting of triethyl phosphate, tri(butoxyethyl) phosphate, a fatty acid having from six to twenty two carbon atoms, di(2-ethylhexyl) phthalate, di(2-ethylhexyl) adipate, dibutyl sebacate, tricresyl phosphate, butyl octyl phthalate, o,p-toulene sulfonamide, and mixtures thereof.

11. The composition of claim 1, wherein said plasticizer is a fatty acid saponified with a volatile base, said fatty acid being selected from the group consisting of oleic acid, coconut fatty acid, tall oil, stearic acid, caprylic acid, lauric acid, myristic acid, pelargonic acid, capric acid, and mixtures thereof.

12. The composition of claim 1, wherein n is about 452, the plasticizer is selected from the group consisting of triethyl phosphate, tri(butoxyethyl) phosphate, and oleic acid, the solute portion comprises about 0.3 percent by weight of the solution, and the weight percentage of polyethylene glycol is at least about four times the weight percentage of the plasticizer.

13. A composition which is applied to a surface in solution form and then dried and high-speed buffed to form a hard, high-gloss and slip-resistant coating on the surface, said composition in solution form having a solute portion which comprises:

a. a solid, waxy polyethylene glycol compound having the formula:

$$HOCH_2(CH_2OCH_2)_nCH_2OH$$

where n represents the average number of oxyethylene groups and is at least about 31; and b. a heat-stable, non-volatile plasticizer compatible with the polyethylene glycol compound and selected from the group consisting of phthalates, adipates, sebacates, phosphates, sulfonamides, fatty acids, and mixtures thereof;

and the solvent portion of which consists essentially of water, wherein said solution when dried and high-speed buffed forms a hard, high-gloss and slip-resistant coating, said plasticizer being present in an amount sufficient to increase the static coefficient of friction (slip resistance) of the coating to at least about 0.5.

14. A composition which is applied to a surface in solution form and then dried and high-speed buffed to form a hard, high-gloss and slip-resistant coating on the surface, said composition in solution form having a solute portion which comprises:

a. a solid, waxy polyethylene glycol compound having the formula:

$$HOCH_2OCH_2OCH_2)_nCH_2OH$$

where n represents the average number of oxyethylene groups and is at least about 31; and b. a heat-stable, non-volatile plasticizer compatible with the polyethylene glycol compound and selected from the group consisting of phthalates, adipates, sebacates, phosphates, sulfonamides, fatty acids, and mixtures thereof;

and the solvent portion of which consists essentially of water, said solute portion comprising of from about 0.15 to about 2.0 percent by weight of the solution, the weight percentage of polyethylene glycol comprising at least twice the weight percentage of the plasticizer, wherein said solution when dried and high-speed buffed forms a hard, high-gloss and slip-resistant coating having a static coefficient of friction (slip resistance) of at least about 0.5.

15. The composition of claim 14, wherein the solute portion comprises of from about 0.2 to about 0.6 percent by weight of the solution.

16. The composition of claim 15, wherein the weight percentage of polyethylene glycol is at least about four times the weight percentage of the plasticizer.

17. A concentrated composition which is applied to a surface in solution form and then dried and high-speed buffed to form a hard, high-gloss and slip-resistant coating on the surface, said concentrated composition in solution form having a solute portion which comprises:

a. a solid, waxy polyethylene glycol compound having the formula:

$$HOCH_2(CH_2OCH_2)_nCH_2OH$$

where n represents the average number of oxyethylene groups and is at least about 31; and b. a heat-stable, non-volatile plasticizer compatible with the polyethylene glycol compound and selected from the group consisting of phthalates, adipates, sebacates, phosphates, sulfonamides, fatty acids, and mixtures thereof;

and the solvent portion of which consists essentially of water, wherein said concentrated solution when diluted with water to form an application solution having a solute concentration of from about 0.15 to about 2.0 percent by weight of the application solution, applied to surface, dried and high-speed buffed, forms a hard, high-gloss and slip-resistant coating, said plasticizer being present in an amount sufficient to increase the static coefficient of friction (slip resistance) of the coating by at least about 5 percent.

18. A process for forming a hard, high-gloss and slip-resistant coating on a surface, said process comprising the steps of:

a. depositing on said surface a layer of a solution, the solute portion of which comprises:
  (i) a solid, waxy polyethylene glycol compound having the formula:

$HOCH_2(CH_2OCH_2)_nCH_2OH$ where n represents the average number of oxyethylene groups and is at least about 31; and
  (ii) a heat-stable, non-volatile plasticizer compatible with the polyethylene glycol compound and selected from the group consisting of pthalates, adipates, sebacates, phosphates, sulfonamides, fatty acids, and mixtures thereof, said plasticizer being present in an amount sufficient to increase the static coefficient of friction (slip resistance) of the coating formed after the solution is dried and high-speed buffed by at least about 5%;

and the solvent portion of which consists essentially of water;

b. permitting the water to evaporate therefrom; and
c. high-speed buffing said layer to form a hard, high-gloss and slip-resistant coating.

19. A process for maintaining the slip resistance of a floor surface comprising the steps of:

a. depositing on the floor surface a layer of a solution, the solute portion of which comprises:
  (i) a solid, waxy polyethylene glycol compound having the formula:

$HOCH_2(CH_2OCH_2)_nCH_2OH$ where n represents the average number of oxyethylene groups and is at least about 3; and
  (ii) a heat-stable, non-volatile plasticizer compatible with the polyethylene glycol compound and selected from the group consisting of phthalates, adipates, sebacates, phosphates, sulfonamides, fatty acids, and mixtures thereof, said plasticizer being present in an amount sufficient to maintain the static coefficient of friction (slip resistance) of the coating formed after the solution is dried and high-speed buffed at 0.5 or higher;

and the solvent portion of which consists essentially of water;

b. permitting the water to evaporate therefrom; and
c. high-speed buffing said layer to form a hard, high-gloss and slip-resistant coating.

* * * * *

UNITED STATES PATENT AND TRADEMARK OFFICE
CERTIFICATE OF CORRECTION

PATENT NO. : 4,778,524

DATED : October 18, 1988

INVENTOR(S) : Chapin

It is certified that error appears in the above-identified patent and that said Letters Patent is hereby corrected as shown below:

Col. 8, line 36 - change formula to    --$HOCH_2(CH_2OCH_2)_nCH_2OH$--

Col. 10, line 20 - change "3" to --31--.

Signed and Sealed this

Twenty-first Day of March, 1989

Attest:

DONALD J. QUIGG

*Attesting Officer*    *Commissioner of Patents and Trademarks*